Jan. 19, 1971     F. McGRATH     3,556,884
PLASTIC TUBE CONSTRUCTION
Original Filed May 2, 1966
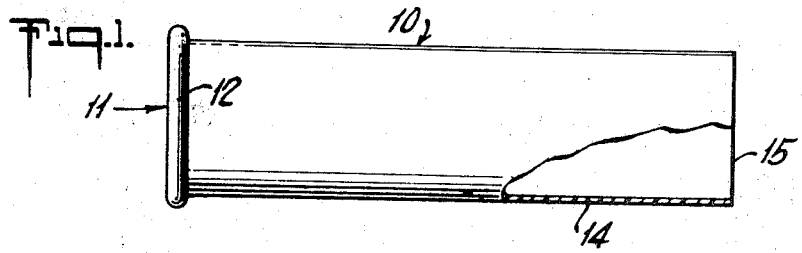
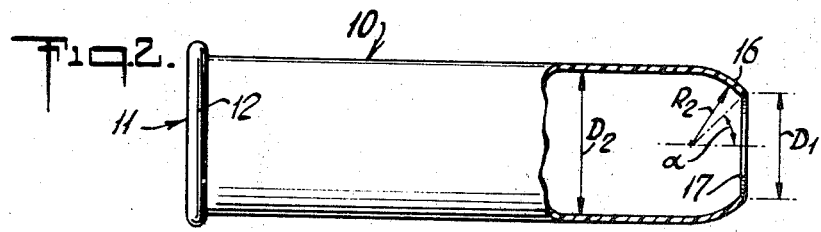
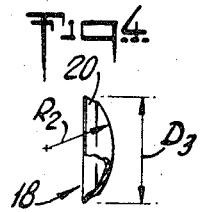
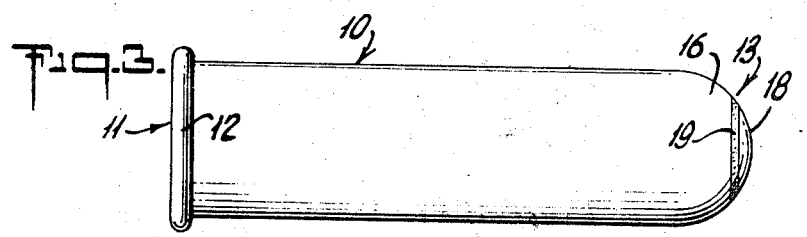
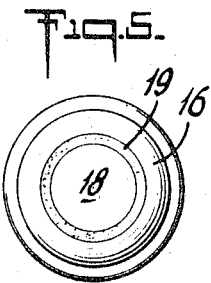
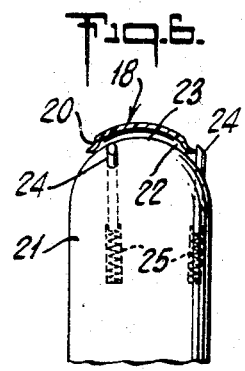
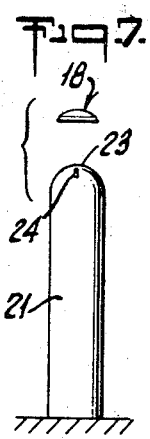
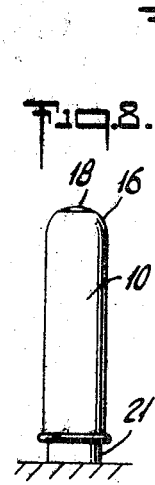
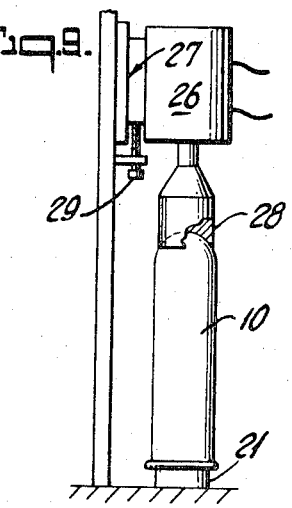
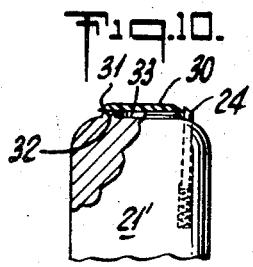
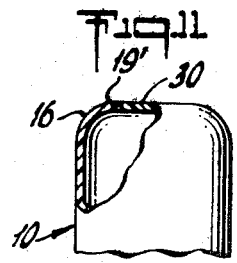
INVENTOR
FRANK McGRATH
BY
Hopgood & Calimafde
ATTORNEYS United States Patent Office 3,556,884
Patented Jan. 19, 1971

3,556,884
PLASTIC TUBE CONSTRUCTION
Frank McGrath, Maplewood, N.J., assignor to Lusteroid Container Company, Inc., a corporation of New Jersey
Original application May 2, 1966, Ser. No. 546,751, now Patent No. 3,448,890. Divided and this application Sept. 9, 1968, Ser. No. 794,431
Int. Cl. B65b 7/16
U.S. Cl. 156—69                         6 Claims

ABSTRACT OF THE DISCLOSURE

The method of the invention contemplates employment of commercially available cylindrical thermoplastic tubing, as of cellulose acetate butyrate, vinyl (PVC), polyethylene, or polycarbonate. The tubing is cut to desired length, and one end is generally spherically rounded in a taper extending inwardly to define a central opening within which an insert (which may be flat or of essentially the same curvature) is inserted and sealed.

---

This invention relates to a semi-rigid plastic tube and to its method of construction, particularly for applications in which the tube is a vessel for the containment of liquid material to be subjected to centrifuge treatment.

This application is a division of parent application, Ser. No. 546,751, filed May 2, 1966, now Pat. No. 3,448,890.

Transparent tubes of the character indicated have either been made of glass, in which case cost and breakage are undesirable factors, or they have been made of plastic. The plastic tubes have either been molded, or they have been "built-up" by dipping a suitable form or mandrel into a liquid bath of plastic; in either event, cost is again an undesirable factor, and the dipped tubes are not as clearly transparent as is desired. Ideally, such tubes should be made entirely of extruded plastic tubing, for high-strength, clear transparency, and low-cost. However, prior efforts to either reshape the tube to close one end, or to add further structure to close the end, have not met all the objectives, including that of withstanding the stresses of centrifugal action.

It is, accordingly, an object of this invention to provide an improved tube construction and method of construction, for applications of the character indicated.

It is a specific object to meet the foregoing object with a structure and method utilizing extruded-plastic tubing and involving minimum introduction of added stress within the tubing material, even when subjected to strong centrifuge action.

Another object is to meet the foregoing objects with a structure which is clearly transparent, which resists breakage, which inherently resists fracture under centrifuge action, and which is of inherently low-cost as to manufacture.

It is a specific object to provide a thin-walled plastic tube construction featuring a transparent spherically rounded bottom and of such inherent low-cost construction as to lend itself to but one use, after which it may be considered disposable.

Other objects and various further features of novelty and invention will be pointed out or will occur to those skilled in the art from a reading of the following specification in conjunction with the accompanying drawings. In said drawings, which show, for illustrative purposes only, preferred forms and methods of the invention:

FIGS. 1, 2, and 3 are similar views in longitudinal elevation, parts of FIGS. 1 and 2 being broken away and in section, and showing successive stages in forming a tube of the invention;

FIG. 4 is a partly broken-away and sectioned side view of an insert member to be assembled to the tube of FIG. 2;

FIG. 5 is a right-end view of the completed tube of FIG. 3;

FIG. 6 is a fragmentary view in vertical elevation of an anvil or support for use in assembling parts of my tube construction;

FIGS. 7, 8, and 9 are similar simplified views, on a reduced scale, to illustrate schematically certain steps in the method of the invention;

FIG. 10 is a view similar to FIG. 6 to illustrate a modification; and

FIG. 11 is a partly broken-away and sectioned fragmentary view in elevation to illustrate an assembled tube according to the modification of FIG. 10.

Briefly stated, the method and structure of the invention contemplates employment of commercially available cylindrical thermo-plastic tubing, as of cellulose acetate butyrate, vinyl (PVC), polyethylene, or polycarbonate. The tubing is cut to desired length, and one end is generally spherically rounded in a taper extending inwardly to define a central opening within which an insert (which may be flat or of essentially the same curvature) is inserted and sealed. Ultrasonic techniques are employed to generate such localized heating of the region of overlap between insert and tube as to establish hermetic sealing and inherent resistance to breakage, even under centrifuge action.

Referring to FIG. 3 and FIG. 4 of the drawing, it is desired to make a plastic tube having an elongated body 10, open at one end 11 (where a retainer flange or bead 12 may be formed) and closed at the other end by a generally spherically rounded closure 13. According to the invention, this is achieved by employing commercially available extruded thin-walled tubing 14 (FIG. 1), cut to desired length at the end 15 to be closed; the material of tube 10 may be one of those indicated above, and my preference is for cellulose acetate butyrate. The cut end 15 is first spun or otherwise subjected to deforming force whereby an inwardly directed taper 16 is developed to define a reduced circular opening 17, of diameter $D_1$ less than the bore diameter $D_2$ (see FIG. 2). The curvature of taper 16 is preferably generally spherical, with a radius $R_2$ conforming substantially to that of the bore of tube 14, and truncated at the opening 17. The angle $\alpha$ between the tube axis and the edge of opening 17 (about the center of curvature for taper 16) is preferably in the range 35° to 55°; stated in other words, the opening diameter $D_1$ is in the order of 70 percent of the bore diameter $D_2$.

Closure of the opening 17 is effected by a dome-shaped generally spherical insert 18 of maximum diameter $D_3$ intermediate the opening diameter $D_1$ and the bore diameter $D_2$, so that when inserted in tube 10 (with the convex side facing axially outward) to close opening 17, there is a region 19 of concentric overlap between parts 16–18. Insert 18 may be formed of the same thermoplastic material as tube 10, as by pressing sheet stock over a suitably shaped die. Preferably, the peripheral edge 20 of insert 18 is beveled with a slope in general conformance with the slope of the concave inner side of taper 16 against which it is to be sealed and secured. The general curvature of insert 18 is preferably also characterized by the spherical radius $R_2$ in conformity with that of taper 16.

Theoretically, adhesives could be employed to seal and secure insert 18 in place, concentrically located in opening 17, however, it is preferred to avoid introduction of any additional material (adhesive) and I rely on the ability of ultrasonic axial pressure excitation to develop sufficient local heating at the overlap region 19 to permanently seal or weld the parts together. For this purpose, I employ an upstanding supporting anvil 21 (FIG. 6) having a raised annular land 22 formed in the otherwise spherical convex head end 23 of anvil 22. Land 22 is of such radical extent as to provide support coextensive with the intended overlap 20, so that insert 18 may be initially supported thereon. To assure concentric positioning, I show plural angularly spaced retainer probes 24, slidably guided in the body of anvil 21 on axes parallel to the anvil axis, and lightly resiliently or otherwise urged to the projecting position shown, as by spring means 25. It will be understood that probes 24 are retracted automatically as the deformed tube 10 (FIG. 2) is placed over anvil 21, as suggested in FIGS. 7 and 8. At the stage depicted in FIG. 8, anvil 10 axially aligns tube 10, with the opening 17 concentric with insert 18, as will be understood.

To complete assembly (FIG. 9), the ultrasonic driver 26 is lowered, on fixed vertical guides 27 sufficiently to place the tool or hammer element 28 thereof in engagement with the parts depicted in FIG. 8. Tool element 28 is concaved for conformity with the outside spherical radius of taper 16 and insert 18, so that upon excitation at ultrasonic frequencies, in the axial direction, and reacting through parts 16–18 at the region of overlap 19, frictionally developed local heat will allow sealing and fusion of the parts over the entire annulus 19. An adjustably fixed stop 29 assures that compression at annulus 19 will cease when the dome of insert 18 is in the same generally spherical contour as that of taper 16.

In FIGS. 10 and 11, I show a modification in which the insert 30 is flat and is again formed from sheet plastic stock, and preferably with a beveled edge 31 conforming generally with the slope of the inturned lip of taper 16, at opening 17. The anvil 21' is similar to that already described except for adaptation to a flat insert. The annular land 32 thus projects slightly above the flat anvil top 33. Upon application of the rounded-end tube 10 of FIG. 2 over the insert-laden anvil 21' of FIG. 10, and by thereupon performing the sealing step indicated in FIG. 9, a permanently sealed and welded tube of FIG. 11 is produced, with smooth inner and outer contour at the fused region 19' of overlap.

It will be seen that I have described an improved tube and method of the character indicated, which may be of such low-cost construction as to render it disposable after one use. Use of tube stock permits precision-dimensioning with thinner walls (e.g. 0.015 to 0.025" thick, for tube diameter in the order of 1 inch to 1.5 inches) than with injection-molded parts. Also, in contrast to injection-molded products, which are inherently more subject to cracking under stress, the tapered deformation 16 of my construction is sufficiently limited as to introduce no material stress; even so, any stress at taper 16 is inherently relieved (and the parts reinforced) upon ultrasonic fusion, as will be understood, and the rest of tube 10 (having such a thin wall) is inherently adapted to greater flexibility and thus greater resistance to cracking under stress. The employment of domed or flat inserts 18–30 of thermoplastic material lends itself to unique external trademark or type designation by imprint without affecting the smooth continuously rounded surface of the entire assembled end 16–18–20.

Although I have described the invention in detail for the preferred form shown, it will be understood that modifications may be made without departing from the scope of the invention as defined in the claims which follow.

I claim:
1. The method of fabricating from sheet and tubular plastic an elongated plastic tube closed at one end and open at the other end, which comprises forming one end of the tubular plastic with an inwardly tapering truncated spherical shape to the extent that a reduced circular opening defines one truncated end of said shape, the diameter of the opening being less than the minimum diametral extent of the bore of the tubular plastic, forming from sheet plastic a shallow domed plastic insert of outer diameter exceeding the diameter of the opening and at the same time clearing the tubular bore, inserting the insert through the other end of the tube into concentric overlap with the lip of the opening, and securing said insert at the region of overlap, with the convex surface of the insert facing axially out the inwardly tapered end of the tubular plastic.

2. The method of fabricating from sheet and tubular plastic an elongated plastic tube closed at one end and open at the other end, which comprises forming one end of the tubular plastic with an inwardly tapering truncated spherical shape to the extent that a reduced circular opening defines one truncated end of said shape, the diameter of the opening being less than the bore diameter of the tubular plastic, forming from sheet plastic a circular plastic insert of outer diameter intermediate the bore diameter and the reduced-opening diameter, inserting the insert through the other end of the tube into concentric overlap with the lip of the opening, and securing said insert at the region of overlap.

3. The method of claim 2, in which the formation of said insert includes formation of the surface which ultimately overlaps the taper of the tube with a characterized shape approximating that of the taper at the region of overlap.

4. The method of claim 2, in which said insert and tube are secured by compressional loading of the region of overlap at an ultrasonic-excitation frequency.

5. The method of claim 4, in which said excitation is directed symmetrically along and with respect to the axis of the tubular plastic.

6. The method of fabricating an elongated plastic tube closed at one end and open at the other end, which method comprises forming one end of a plastic tube with an inwardly tapering truncated shape to the extent that a reduced circular opening defines one truncated end of said shape, the diameter of the reduced opening being less than the bore diameter of the tubular plastic, forming a circular plastic insert of outer diameter intermediate the bore diameter and the reduced-opening diameter, positioning said insert in circumferential overlap with the lip of the opening, and securing said insert to said lip at the region of overlap.

References Cited
UNITED STATES PATENTS

| | | | |
|---|---|---|---|
| 2,739,917 | 3/1956 | Schulze | 156—69 |
| 3,224,916 | 12/1965 | Soloff | 156—73 |
| 3,385,741 | 5/1968 | Allen | 156—69 |
| 3,446,688 | 5/1969 | Flax | 156—69X |
| 3,456,564 | 7/1969 | McCandless | 156—69X |

CARL D. QUARFORTH, Primary Examiner

A. J. STEINER, Assistant Examiner

U.S. Cl. X.R.

156—73, 293, 303.1